(12) United States Patent
Okada et al.

(10) Patent No.: US 11,099,334 B2
(45) Date of Patent: Aug. 24, 2021

(54) RETENTION ASSEMBLY FOR SECURING POF FIBER WITHIN A CONNECTOR

(71) Applicants: Senko Advanced Components Inc, Marlborough, MA (US); Nitto Denko Corporation, Osaka (JP)

(72) Inventors: Kazumasa Okada, Osaka (JP); Yuichi Tsujita, Osaka (JP); Keita Kiyoshima, Osaka (JP); Kenji Iizumi, Tokyo (JP); Yuki Nishiguchi, Kowloon (HK); Kazuyoshi Takano, Tokyo (JP)

(73) Assignees: Senko Advanced Components, Inc., Marlborough, MA (US); Nitto Denko Corporation, Osaka (JP)

( * ) Notice: Subject to any disclaimer, the term of this patent is extended or adjusted under 35 U.S.C. 154(b) by 0 days.

(21) Appl. No.: 16/532,376

(22) Filed: Aug. 5, 2019

(65) Prior Publication Data

US 2020/0049903 A1    Feb. 13, 2020

Related U.S. Application Data

(60) Provisional application No. 62/716,119, filed on Aug. 8, 2018.

(30) Foreign Application Priority Data

May 24, 2019    (JP) .............................. JP2019-098045

(51) Int. Cl.
    *G02B 6/38*    (2006.01)
    *G02B 6/44*    (2006.01)
(52) U.S. Cl.
    CPC ......... *G02B 6/3887* (2013.01); *G02B 6/4432* (2013.01)

(58) Field of Classification Search
    CPC .................................................. G02B 6/3887
    See application file for complete search history.

(56) References Cited

U.S. PATENT DOCUMENTS

| 5,724,127 A | 3/1998 | Csipkes et al. |
| 7,356,236 B1 | 4/2008 | Huang et al. |
| 8,876,405 B2 * | 11/2014 | Larson ................. G02B 6/3887 385/81 |
| 2011/0009694 A1 | 1/2011 | Schultz et al. |
| 2011/0069927 A1 | 3/2011 | Tsai |
| 2011/0085159 A1 | 4/2011 | Levin et al. |

(Continued)

FOREIGN PATENT DOCUMENTS

JP    11237526 A  *  8/1999 ........... G02B 6/3825

OTHER PUBLICATIONS

International Search Report and Written Opinion issued for PCT/US2019/049780, dated Jan. 6, 2020, 13 pages.

(Continued)

*Primary Examiner* — Omar R Rojas
(74) *Attorney, Agent, or Firm* — Stinson LLP

(57) ABSTRACT

An optical connector assembly having a connector housing with a first and second end. First end accepts a ferrule assembly, and second end accepts a retention assembly. There is a longitudinal bore from a distal to proximal end of connector. Bore accepts a POF optical fiber therein at distal end and fiber is inserted proximally until fiber bottoms-out at proximal end of ferrule. Retention body accepts one or more retention caps, or retention body contains at least one retention wing set to secure fiber to connector.

19 Claims, 24 Drawing Sheets

(56) References Cited

U.S. PATENT DOCUMENTS

| | | | |
|---|---|---|---|
| 2012/0301085 A1* | 11/2012 | Grinderslev | G02B 6/3887 |
| | | | 385/77 |
| 2013/0094821 A1 | 4/2013 | Logan | |
| 2016/0131857 A1 | 5/2016 | Goncalves et al. | |
| 2017/0059783 A1 | 3/2017 | Kenji et al. | |
| 2018/0024294 A1 | 1/2018 | Wang et al. | |

OTHER PUBLICATIONS

International Search Report and Written Opinion; Application No. PCT/US19/45705, dated Dec. 11, 2019, pp. 11.

\* cited by examiner

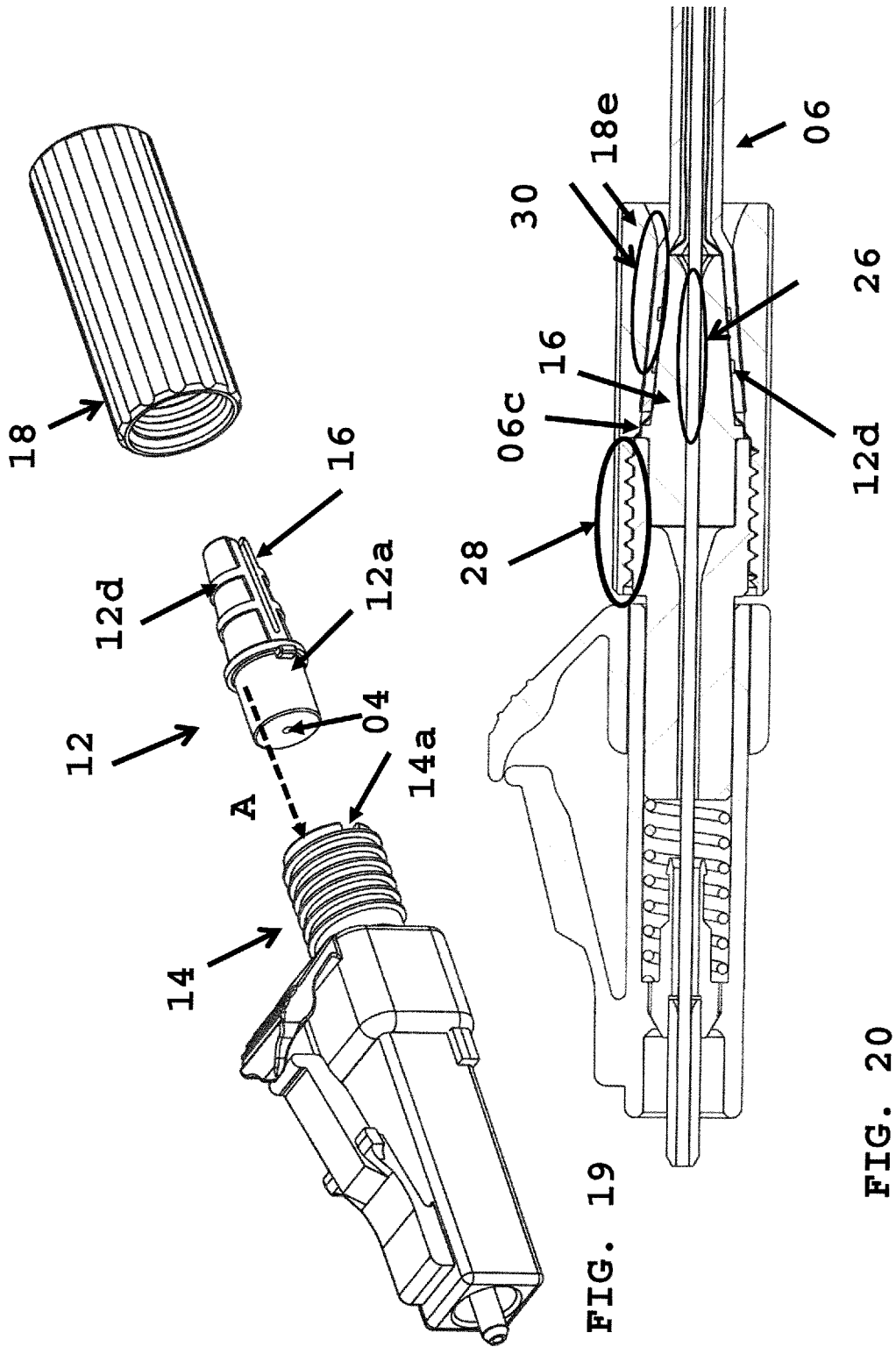

RETENTION ASSEMBLY FOR SECURING POF FIBER WITHIN A CONNECTOR

CROSS REFERENCE TO RELATED APPLICATIONS

This application claims priority to U.S. Provisional Patent application No. 62/716,119 filed Aug. 8, 2018 and to Japanese Patent application no. 2019-098045 filed May 24, 2019, and both patent applications are fully incorporated by reference.

FIELD OF THE INVENTION

The present disclosure relates generally to fiber optic connectors and systems, and specifically to securing plastic fiber optic strands using a retention assembly. The strands made out of plastic are cleaved in the field, inserted into a SC, LC or MPO ferrule assembly.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connects, still exists. For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment. For example, one current footprint is known as the small form-factor pluggable transceiver footprint (SFP). This footprint currently accommodates two LC-type ferrule optical connections. However, it may be desirable to accommodate four optical connections (two duplex connections of transmit/receive) within the same footprint. Another current footprint is the quad small form-factor pluggable (QSFP) transceiver footprint. This footprint currently accommodates four LC-type ferrule optical connections. However, it may be desirable to accommodate eight optical connections of LC-type ferrules (four duplex connections of transmit/receive) within the same footprint.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

The reliability of communication infrastructure depends on secure connections between components, such as cable segments, network equipment, and communication devices. Such connections are continually exposed to dust, dirt, moisture, and/or other contaminants that may infiltrate the connections and degrade performance or even sever the connection between components.

Fiber is typically glass. The glass has an outer jacket, inner strength or reinforcing fibers and a covering. These components are stripped and pulled back. The glass fiber is cleaved, inserted into a ferrule assembly and polished. The glass fiber is polished at a proximal end of the connector. Ferrule assembly is inserted into a connector housing and secured therein. The distal end of the fiber cable is secured with a crimp ring and a crimp boot.

As connectors reduce in size, there needs to be an easy and efficient way to remove a connector from a receptacle. A receptacle can be located in adapter or transceiver housing.

SUMMARY OF THE INVENTION

The present invention reduces field install time when the POF Fiber with or without a cable jacket is inserted and clamped to the connector housing. There is no measuring of the exposed glass fiber when inserting into a ferrule or the amount of outer cable jacket needed before crimping. This is a substantial time savings.

The connector assembly includes one or more fixing members formed as part of a retention body and a retention cap. The retention body is secured to a connector housing of the connector assembly. Retention cap or the connector housing separately or both bias the one or more fixing members to secure the POF fiber, strength members of jacket to form the connector assembly. The fixing members are formed from at least a pair of opposing, flexible wings that are biased closed about the POF fiber or cable. The POF optical fiber was previously inserted within a bore through the center line of the connector assembly. The connector assembly includes a connector housing, a ferrule therein, a retention body, a POF fiber or cable, a retention cap and a latch. The retention body is secured to a distal end of the connector housing, where the distal end is opposite the ferrule end of the connector housing. The ferrule end of the connector housing is called the proximal end.

In use, the polymer fiber optic cable jacket is stripped back to the optical fiber exposing the strength members. The optical fiber is inserted into a bore through a retention cap, and through a bore in the retention body which connects to a channel or bore in a connector housing. A ferrule accepts the polymer optical fiber ("POF") within a bore of the ferrule. Ferrule assembly includes ferrule and POF is inserted into connector housing, typically at a distal end thereof. Once the ferrule assembly is secured within the connector housing, a retention body is inserted and secured at the distal end of the connector housing. A retention cap is inserted at a distal end of the retention body. Upon insertion into a distal end of the connector housing a fixing member having a pair of wings, in an embodiment, clamps the optical fiber, strength members, or cable jacket individually, or a combination of optical fiber, cable jacket and strength members. A second fixing member opposite of the first fixing member may clamp each of the above components individually or together. The first fixing member is clamped by corresponding structure at a distal end of the connector housing and the second fixing member is biased closed or clamped by the retention cap. The opposing fixing members are formed at either end of the retention body.

The fixing members or wings are chamfered or have a radius to guide in the optical fiber, cable jacket or jacketed optic fiber and any combination of the aforementioned components into the bore along the longitudinal axis of the connector into a proximal end of the ferrule. The radius or chamfer are opposite each other or face each other and the chamfer is formed as part of the wing.

BRIEF DESCRIPTION OF THE DRAWINGS

FIG. 19 is an exploded view of a sixth embodiment of the retention assembly;

FIG. 20 is a cross-section of the connector of FIG. 19 assembled;

DETAILED DESCRIPTION

The following terms shall have, for the purposes of this application, the respective meanings set forth below.

A connector is a device the completes a communication path from a fiber strand transmits a light signal to another connector or to transceiver electronics. The electronics convert the light signal into a digital signal. A connector is inserted and secured at either end of adapter, for example, a ferrule connector (FC), a fiber distributed data interface (FDDI) connector, an LC connector, a mechanical transfer (MT) connector, a standard connector (SC) connector, an SC duplex connector, or a straight tip (ST) connector. The connector may generally be defined by a connector housing body, an external latch or recess to secure said connector into adapter opening and one or more ferrules having optic fibers therein. In some embodiments, the housing body may incorporate any or all of the components described herein.

A receptacle is an adapter with internal structure to secure a proximal end or ferrule end of a connector within a port or opening. An adapter allows a first and second connector to interconnect or oppose each other to transmit a light signal from one part of a cable assembly to another, as an example. A receptacle may be a transceiver with an opening to receive a connector.

A "fiber optic cable" or an "optical cable" refers to a cable containing one or more optical fibers for conducting optical signals in beams of light. The optical fibers can be constructed from any suitable transparent material, including glass, fiberglass, polymer optical fiber, or plastic. The cable can include a jacket or sheathing material surrounding the optical fibers. Between the outer sheath and the optical fiber are strands of strength members or tensile members. In addition, the cable can be connected to a connector on one end or on both ends of the cable.

Figure 1:
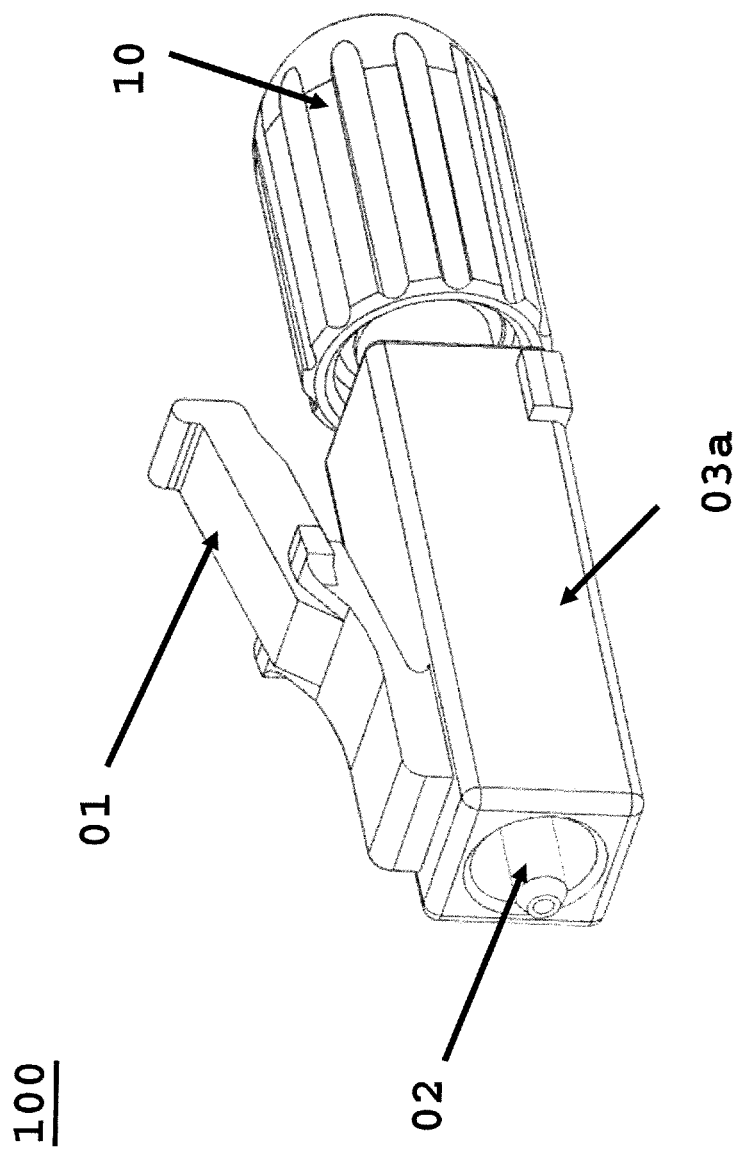
FIG. 1 is a perspective view of the present invention connector using a screw cap retention assembly.

FIG. 1 depicts a first embodiment of optical connector 100 comprising a retention assembly, connector housing 03a, latch 01 and ferrule 02. The retention assembly is made up of retention cap 10 with retention threads 20 and bore 04 there through that accepts POF optical fiber 06b or a plastic fiber strand capable of transmitting light. The light has varying frequencies that represent information, as described above.

Figure 2:
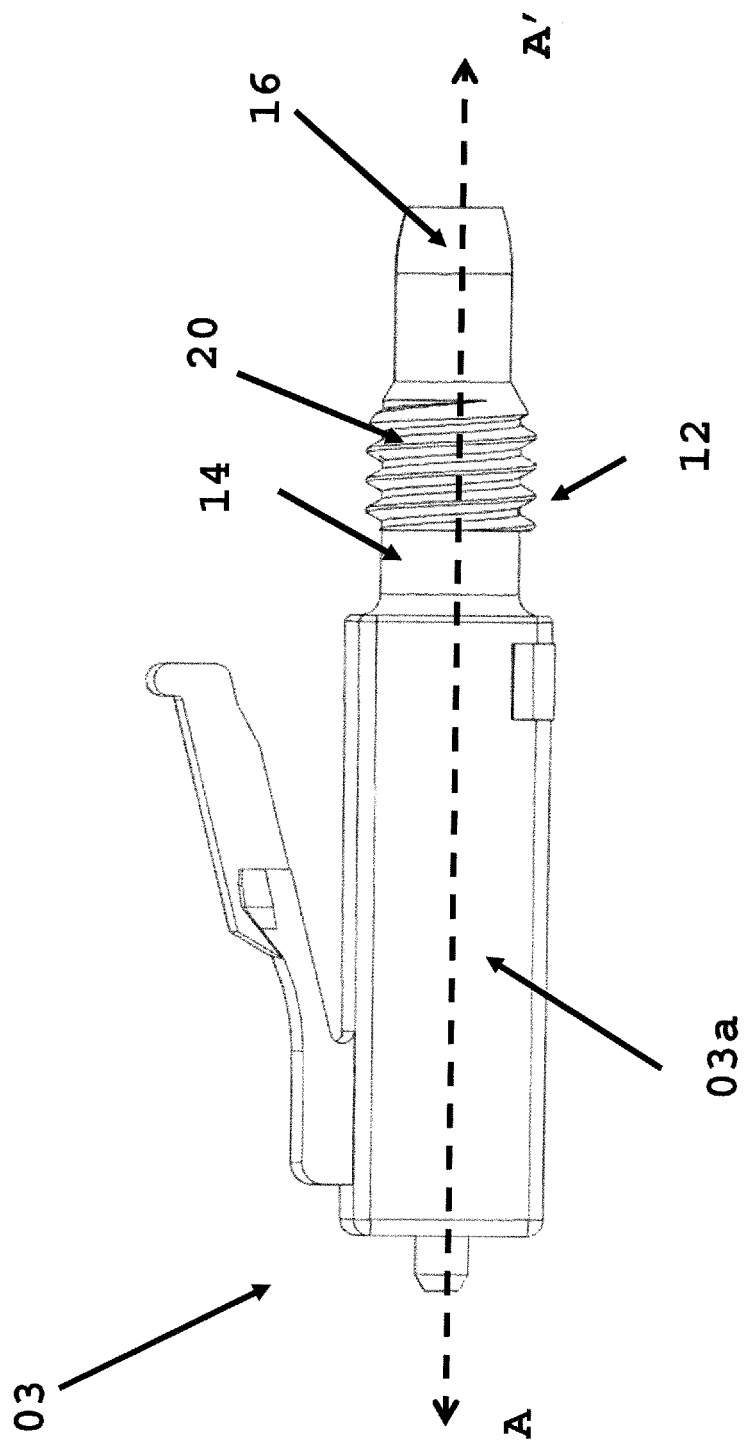
FIG. 2 is FIG. 1 without a retention cap.

FIG. 2 depicts retention body 12 secured within connector housing 03a with retention threads 20 and one or more retention wings 16 at a distal end of connector assembly of FIG. 1. The longitudinal axis or POF fiber channel 04 of the connector assembly is along line A-A'. A proximal end of connector housing 03a is closer to ferrule 02, and distal end is closer to incoming fiber or wings 16.

Figure 3:
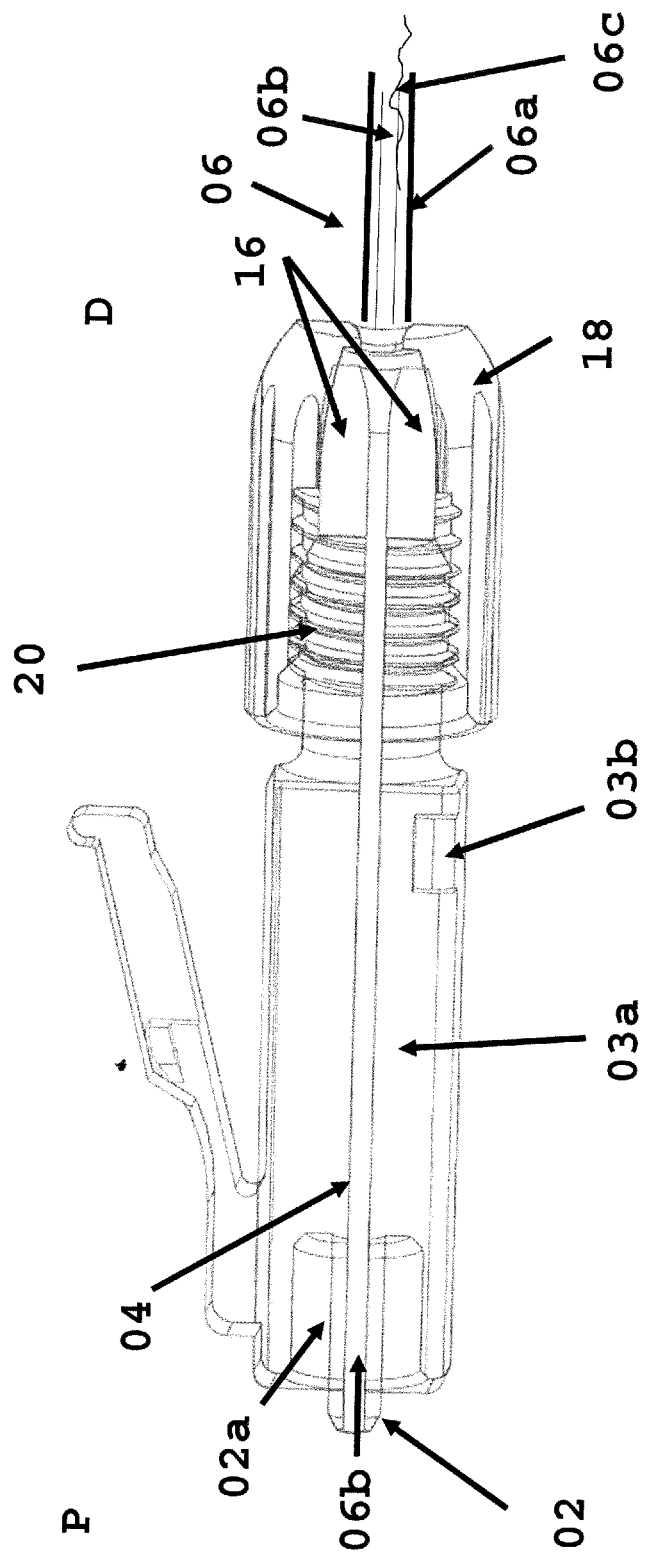
FIG. 3 a cross-section along line A-A' of FIG. 2 with retention cap installed.

FIG. 3 depicts cross-section of FIG. 1 along line A-A'. POF fiber channel 04 is longitudinal bore 24 (FIG. 4) or POF fiber channel 04 from the distal ("D") to proximal ("P") end of connector assembly 03. Jacketed 06a polymer optical fiber (POF) or jacketed fiber cable 06 is inserted into bore 24 typically from distal end until it bottoms-out or is fully inserted thru to a proximal end of ferrule 02. Retention cap 18 is inserted over distal end of connector and engages retention threads 20 in a clock-wise direction or counter clockwise direction. As the cap is rotated retention wings 16 are depressed circumferential and clamp around POF cable 06, which secures POF cable 06 as part of connector assembly 03. More common methods are crimping a cable over a crimp ring with teeth that dig into an outer cable jacket.

Jacketed POF cable 06 has jacket 06a and optical fiber 06b. Between jacket 06a and optical fiber 06b is a plural of strength members 06c. Strength members 06c are secured between the retention cap 18 and retention threads 20 to help prevent disconnection of optical fiber 06b from the ferrule 02 when stress is placed on POF cable 06. Strength members 06c are formed from aramid fiber or polyester fiber, however small gauge wire may be used. Jacket 06a protects strength members 06c and optical fiber 06b. Jacket 06a may be made of a resin such as polyvinyl chloride. Optical fiber 06b has a high refractive index which forms a transmission path of a light signal carrying data. The jacket 06a and strength members 06c form a cladding about the fiber. Cladding has a lower refractive index that reflects the light signal back into the fiber thereby reducing data loss. Optical fiber 06b may be made of a resin material such as polymethyl methacrylate.

Figure 4:
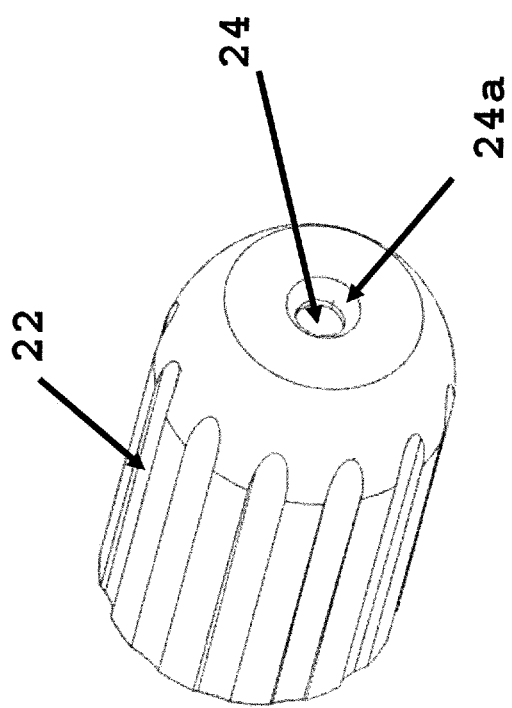
FIG. 4 is a perspective view of the retention cap of FIG. 1.

FIG. 4 depicts retention cap 18 and opening leading to bore 24. The opening is chamfered 24a inward to help guide the POF fiber into bore 24, and the opening is sized to ensure POF Fiber can be inserted without jamming. Outer grooves 22 assist user in attaching cap onto retention body 12 at its distal end.

Figure 5:
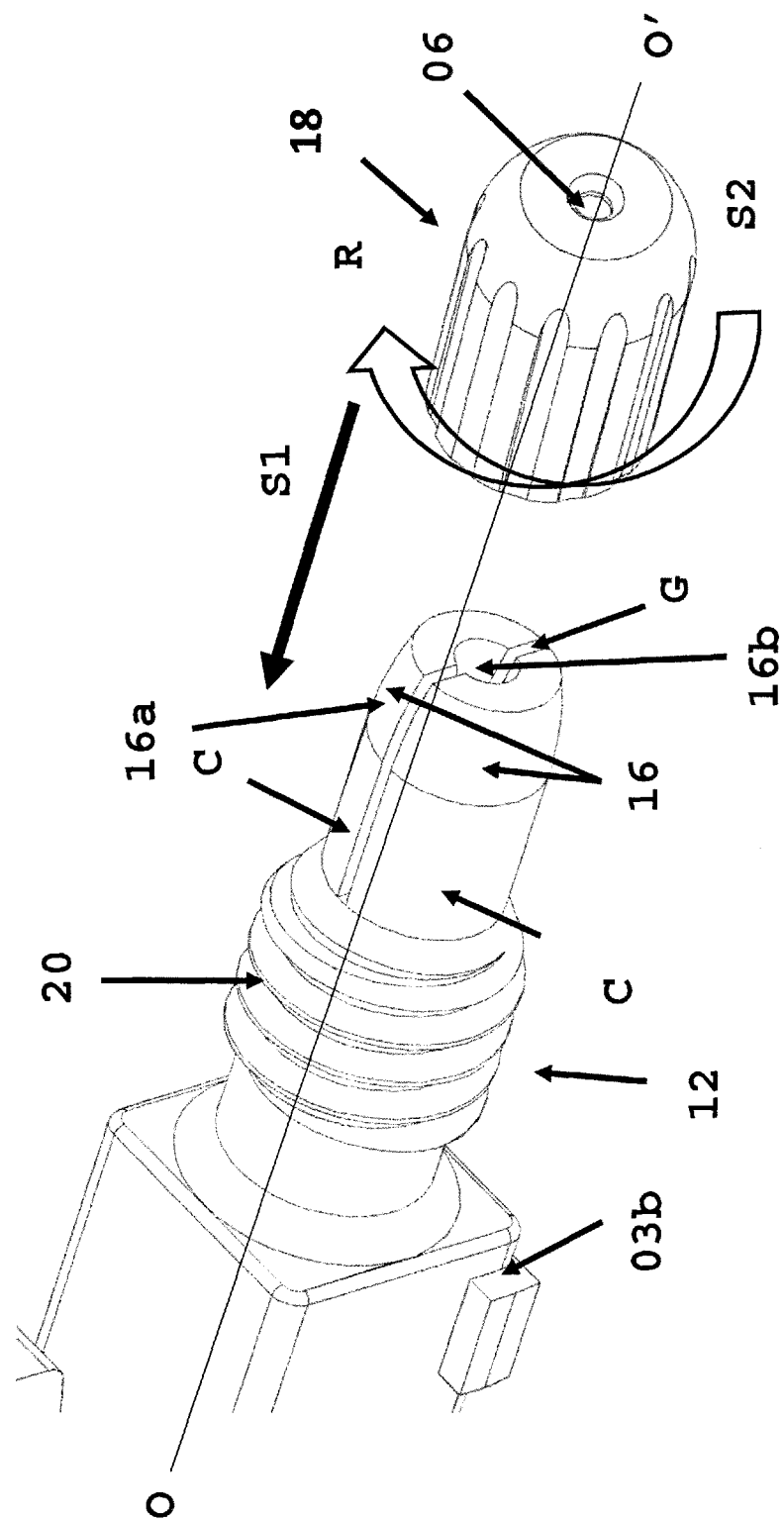
FIG. 5 is a perspective view of retention wings compressed in "C" direction upon insertion of retention cap.

FIG. 5 depicts method of securing a POF optical fiber using retention cap 18 that is rotated onto retention threads 20 of retention body 12. As cap 18 is rotated in direction of arrow "R", retention wings 16 are compressed "C" inward over a POF optical fiber (not shown) inserted in bore along line O-O'. The draft angle of threads and number of rotations determines compressive force applied to each retention wing 16. Gap "G" is formed between retention wings 16. Wings 16 are also called clamping pieces. Wings 16 have tapered surface 16b or radius that guides POF or jacket POF into bore 24 that forms POF channel 04. Wings 16 have a circumferential surface 16a or frustum conical surface chamfer that guides retention cap 18 onto wings 16, which clamp or secure POF or jacketed POF to distal end of connector assembly 03. Optical fiber 06b or jacketed POF cable 06 is inserted along line O-O'.

Figure 6:
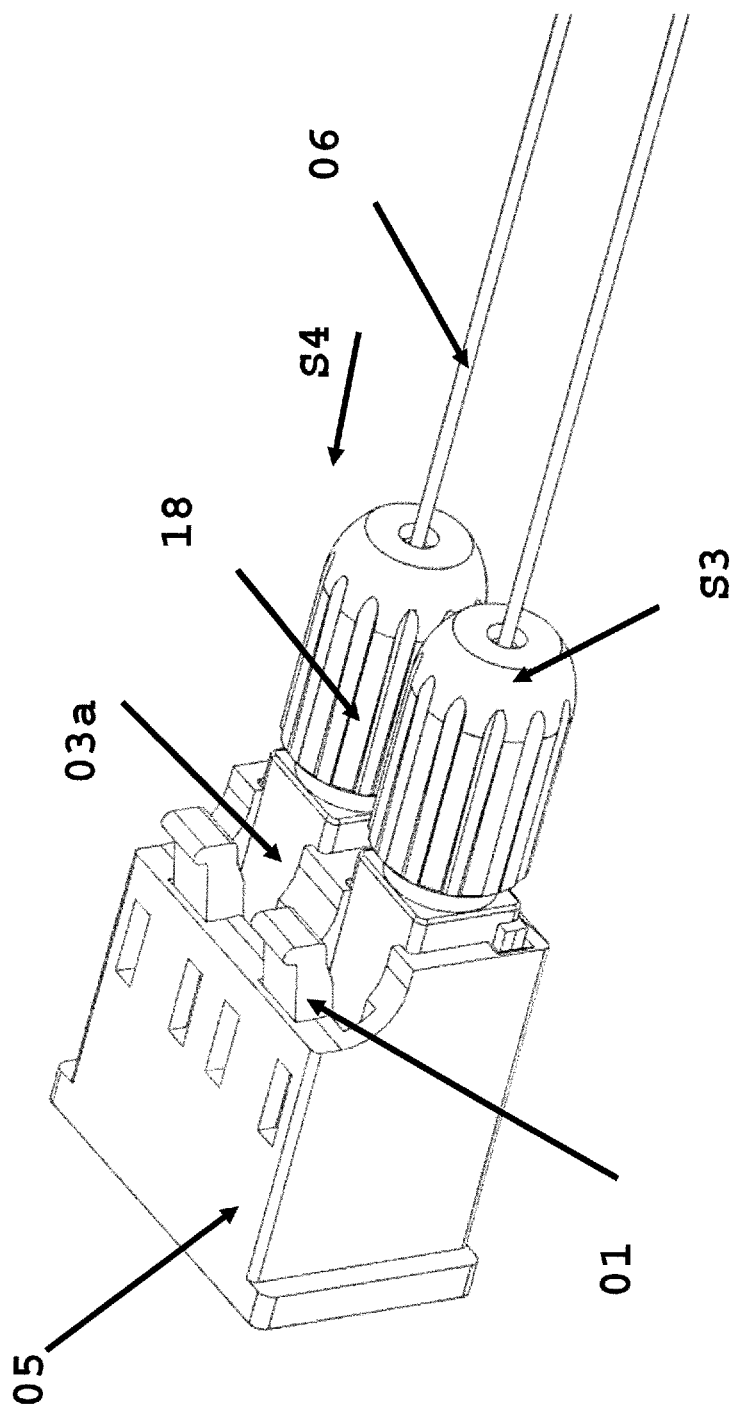
FIG. 6 is a perspective view of FIG. 1 connector assembly installed in a receptacle.

FIG. 6 depicts a pair of connector assembly 03, deploying threaded retention cap 18, inserted into receptacle 05. Jacketed POF cable 06 is shown fully inserted and secured between retention wings (as explained in FIG. 5). Connector housing 03a secures retention body 12 at a distal end of the housing, and cap 18 secures jacketed POF cable 06 within connector assembly 03.

Referring to FIGS. 5 and 6, the field installable operation using the embodiments of the invention is described. In S1, FIG. 5, the jacketed POF cable 06 is inserted along bore 24 at distal end of retention cap 18. Optical fiber 06b is secured within ferrule 02, via POF fiber channel 04, as depicted in FIG. 3, after cable jacket 06b is stripped and strength members 06c are pulled back. Ferrule 02 is secured by ferrule assembly 2a (FIG. 3) at proximal end of connector housing 03a. Connector housing latch 03b secures retention body 12 at distal end of connector housing 03a. Continuing with FIG. 5, in S1, retention cap 18 is inserted over wings 16 along tapered surface 16b, which guides retention cap onto retention body 12 at a distal end and screwed onto threads 20 at S2. Continuing with FIG. 6, at S3 retention cap 18 is completely secured by fully screwing onto retention threads 20 formed as part of retention body 12. In S4, connector assembly 03 is inserted into a port of receptacle 05, and latch 01 secures the connector in receptacle 05.

Figure 7:
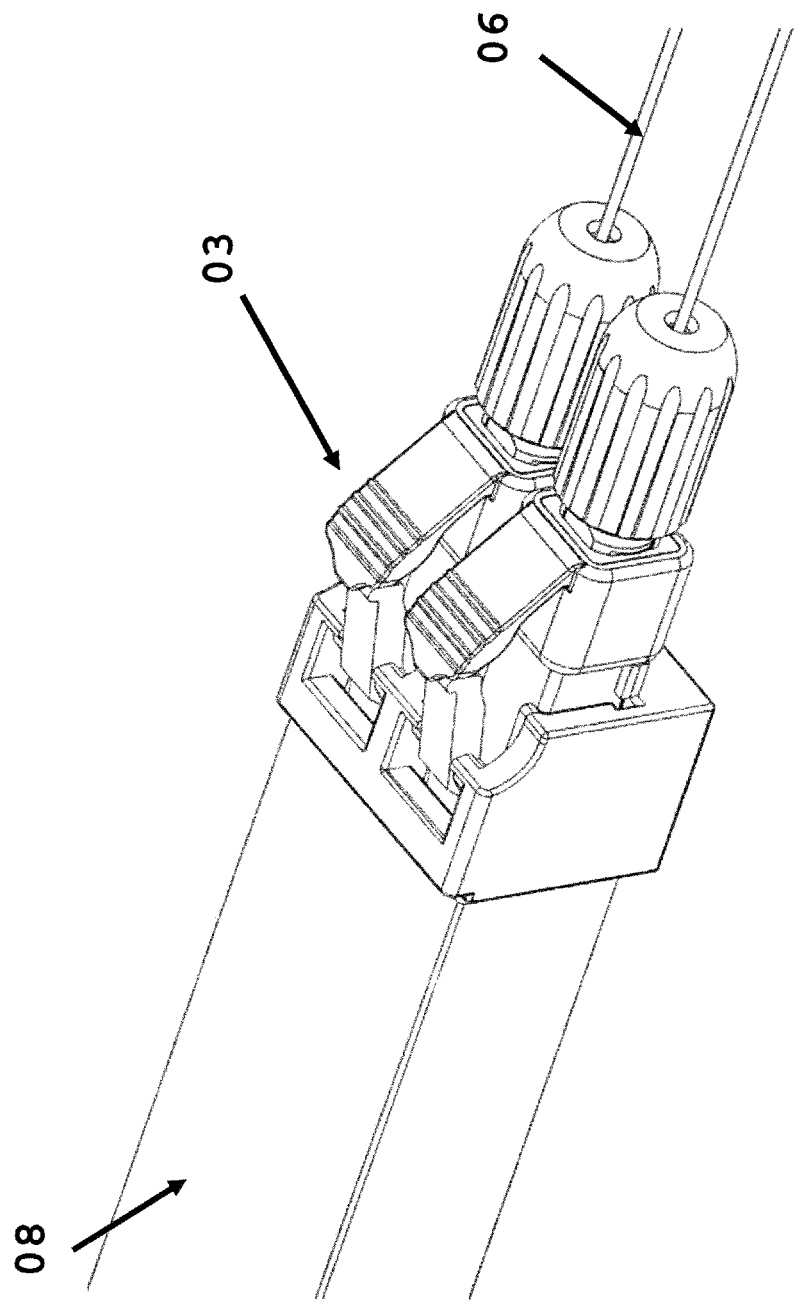
FIG. 7 is a perspective view of FIG. 1 connector assembly installed in a standard transceiver.
Figure 8:
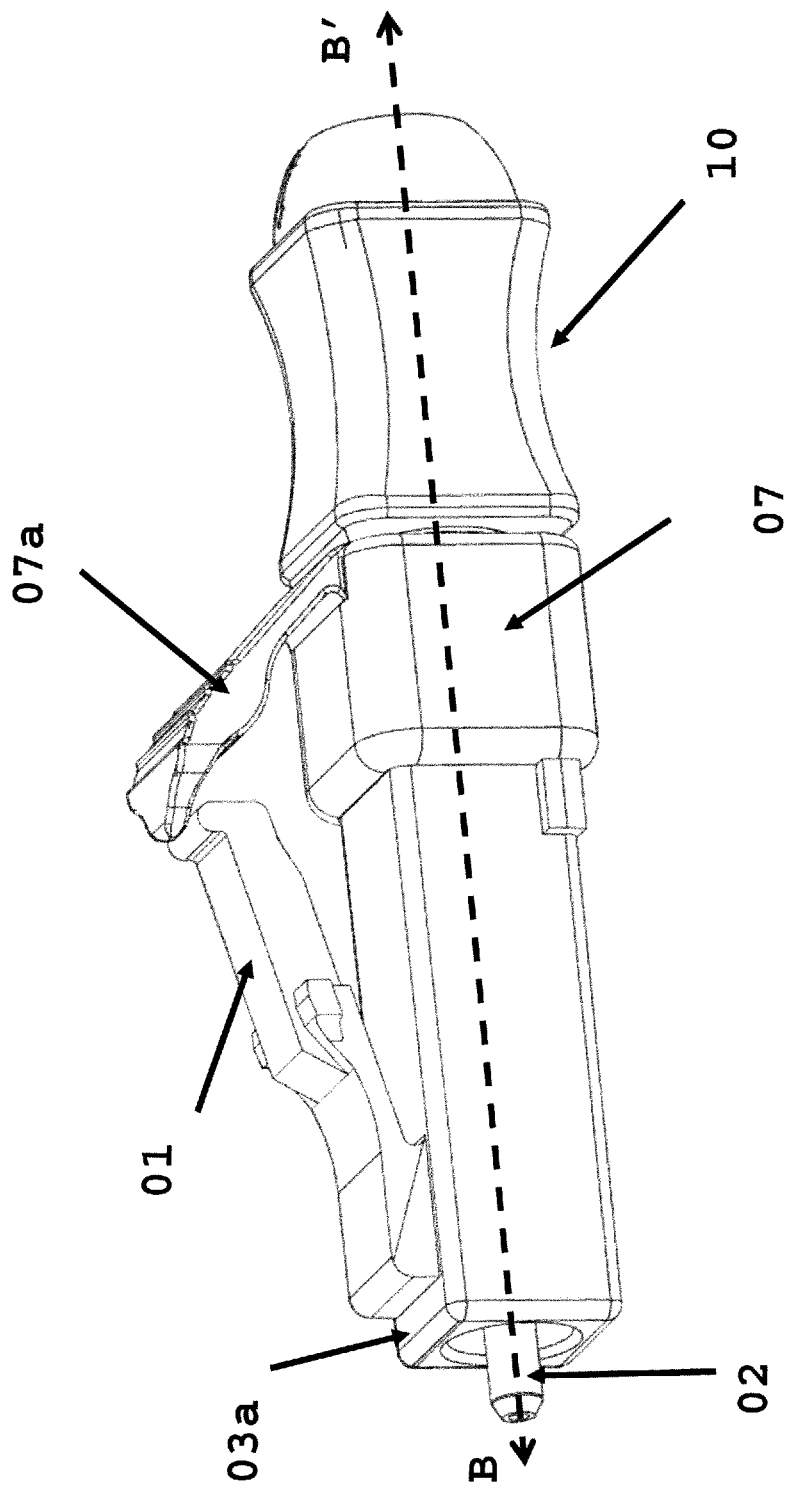
FIG. 8 is a perspective view of another embodiment of the retention assembly of the present invention.

FIG. 7 depicts connector assembly 03, with retention assembly fully inserted into standard SFP transceiver receptacle 08. FIG. 8 depicts a second embodiment of connector assembly 03 deploying slide retention cap 10 to compress wings 16 to secure POF jacketed cable 06 within connector housing 03a. The longitudinal axis of the connector assembly is along line B-B'. Connector release housing 07 is secured over the distal end of the connector housing 03a. Thumb release 07a depresses latch 01 which allows connector assembly 03 to be released from a receptacle port formed as part of an adapter or transceiver housing.

Figure 9:
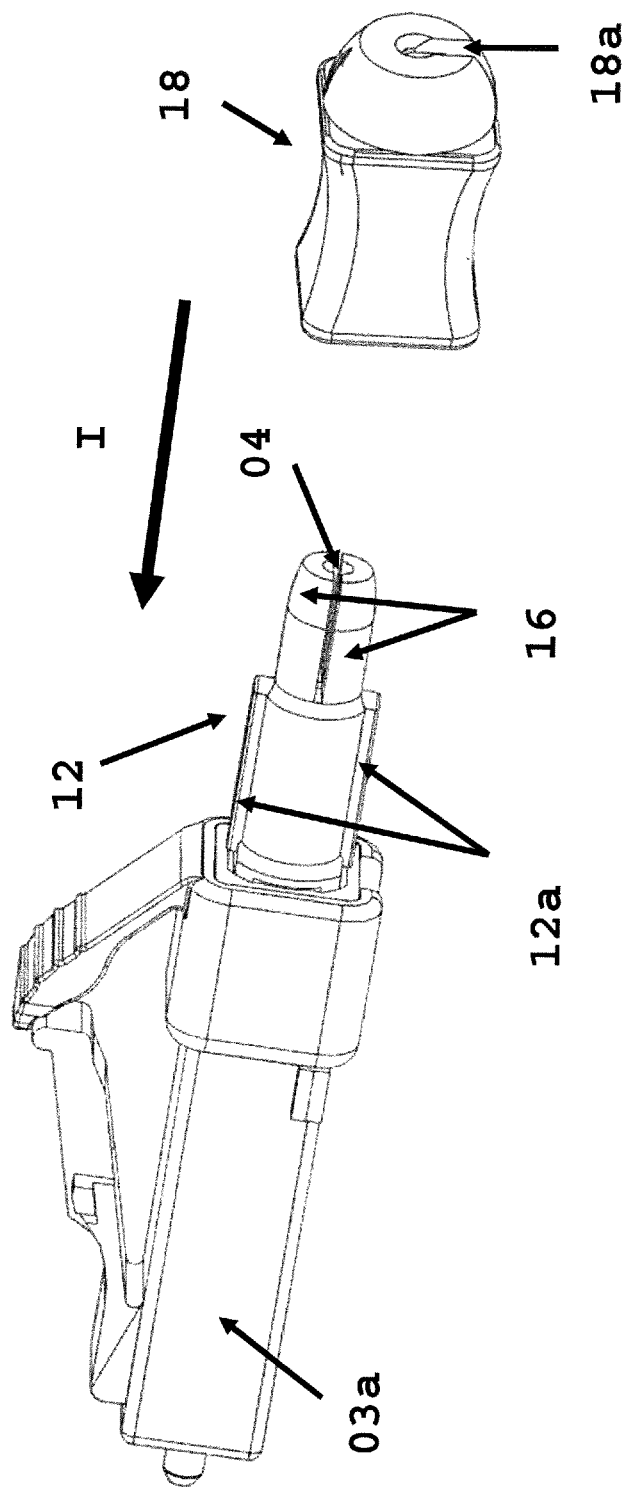
FIG. 9 is the view of FIG. 8 with the retention cap removed from the retention body.

FIG. 9 depicts a partially exploded view of the connector assembly 03 for FIG. 8. Retention body 12 has a pair of opposing wedged shaped protrusions 12a that receive and lock slider retention cap 18. Protrusions 12a are accepted into a corresponding slot 18a formed as part of cap 18. Wings 16 are formed at a distal end of retention body 12. POF jacketed cable 06 or optical fiber without jacket 06b, that is just the polymer optical fiber or POF, is received in POF fiber channel 04. When cap 18 is slide over wings 16, in direction of arrow "I", wings 16 are compressed as depicted in FIG. 5, and cap 18 is retained onto retention body 12 via protrusion 12a fitted into slot 18a.

Figure 10:
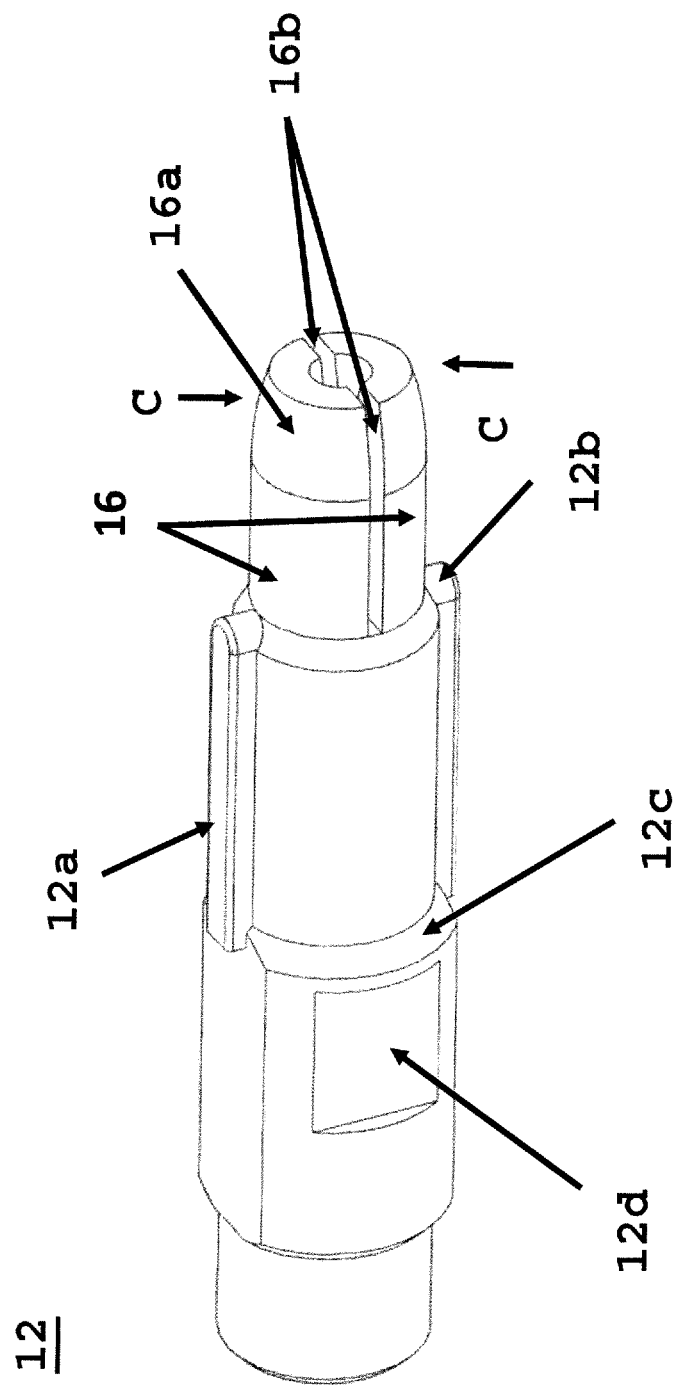
FIG. 10 is a perspective view of retention body of FIG. 9.

FIG. 10 depicts retention body 12 for slide lock deployment. Retention cap 18 engages inclined circumferential surface or frustum conical surface chamfer 16a which orients cap 18 to its internal slot 18a or recess (FIG. 9) that engages wedged shape securing protrusion 12a. Continue pushing retention cap 18 toward proximal end of connector, places a compressive force "C" onto retention wings, which secures POF fiber already fully inserted through longitudinal POF fiber channel 04. Retention cap 18 is fully inserted depressing wings 16 onto POF cable 06, when cap 18 chamfered face 18b is seated against receiving face 12c of retention body 12. Referring to FIG. 10, retention cap slot 18a (FIG. 11) accepts wedged shaped securing protrusion 12a that is rounded 12b to guide it into slot 18a. Retention body 12 comprises ribs 12d. Ribs 12d accepts latch 03b (FIG. 3) to secure retention body 12 within connector housing 03a.

Figure 11:
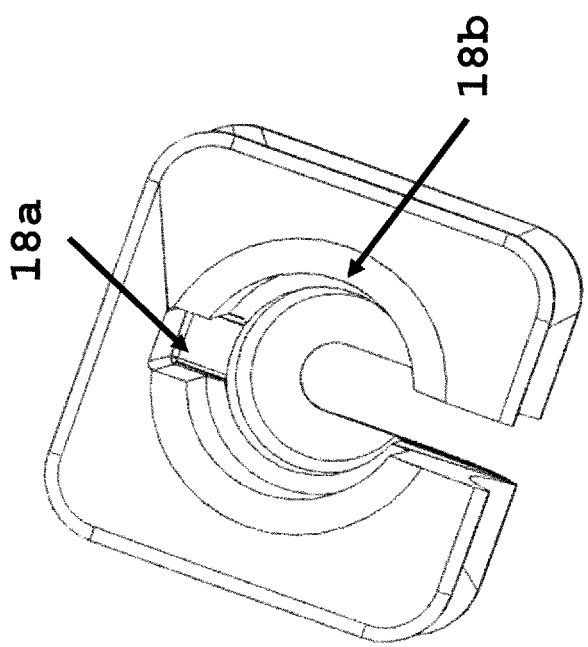
FIG. 11 is an end view of the retention cap of FIG. 9.
Figure 12:
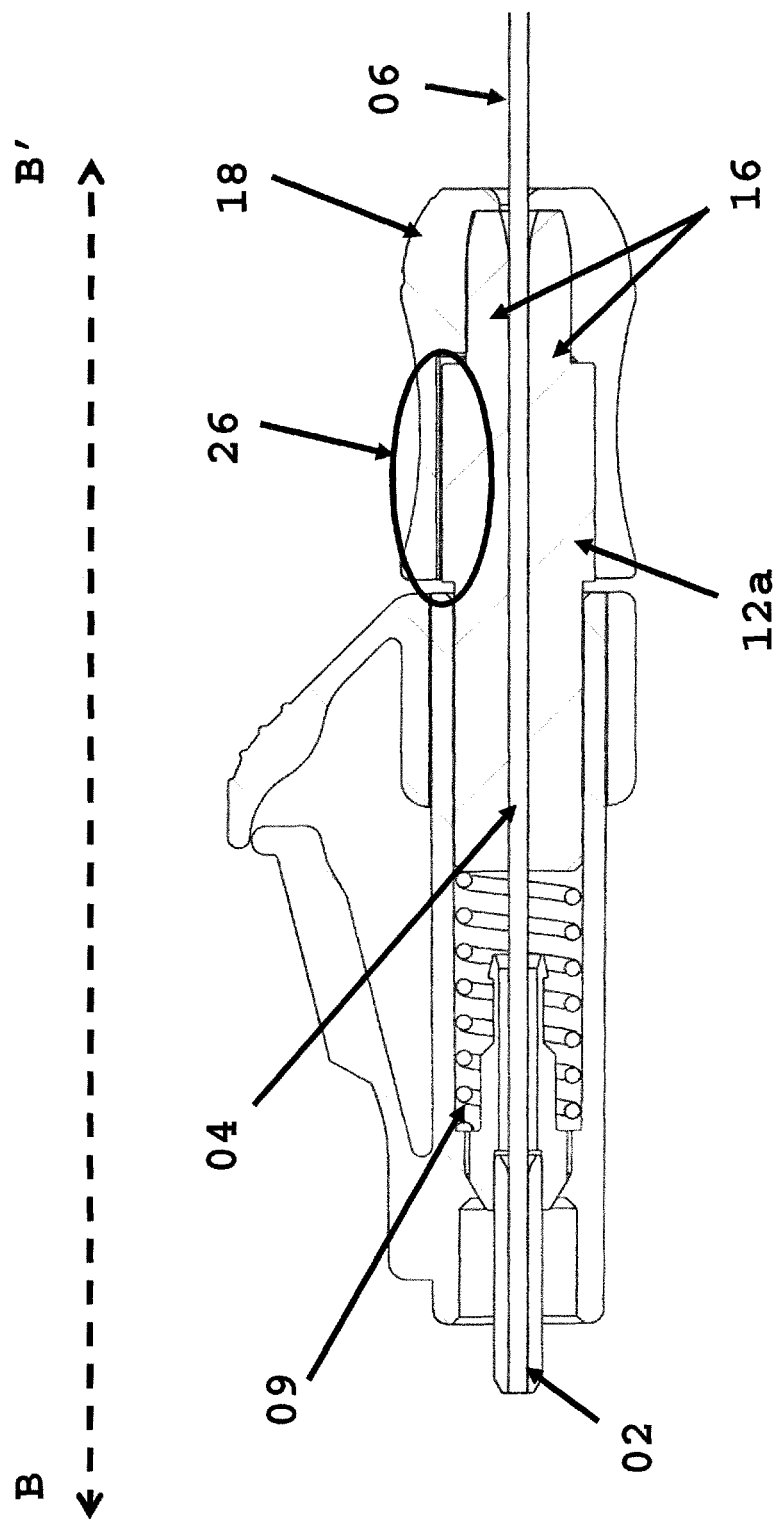
FIG. 12 is a cross-section view along line B-B' of FIG. 9.

FIG. 11 depicts an end view of retention cap 18. Slot 18a accepts wedged shaped protrusion 12a. Bore of cap 18 is tapered 18b to guide retention cap 18 over retention wings 16. FIG. 12 is cross-section of FIG. 9 (assembled) along B-B' line. As depicted, wings 16 are compressed clamping POF cable 06. Wedged shaped protrusion 12a is secured within slot 18a, as show in call out 26. Cable 06 was previously inserted along POF channel 04 with POF optical fiber 06b secured at proximal end of ferrule 02. Bias spring 09 maintains orientation of connector assembly 03 components after assembly.

Figure 13:
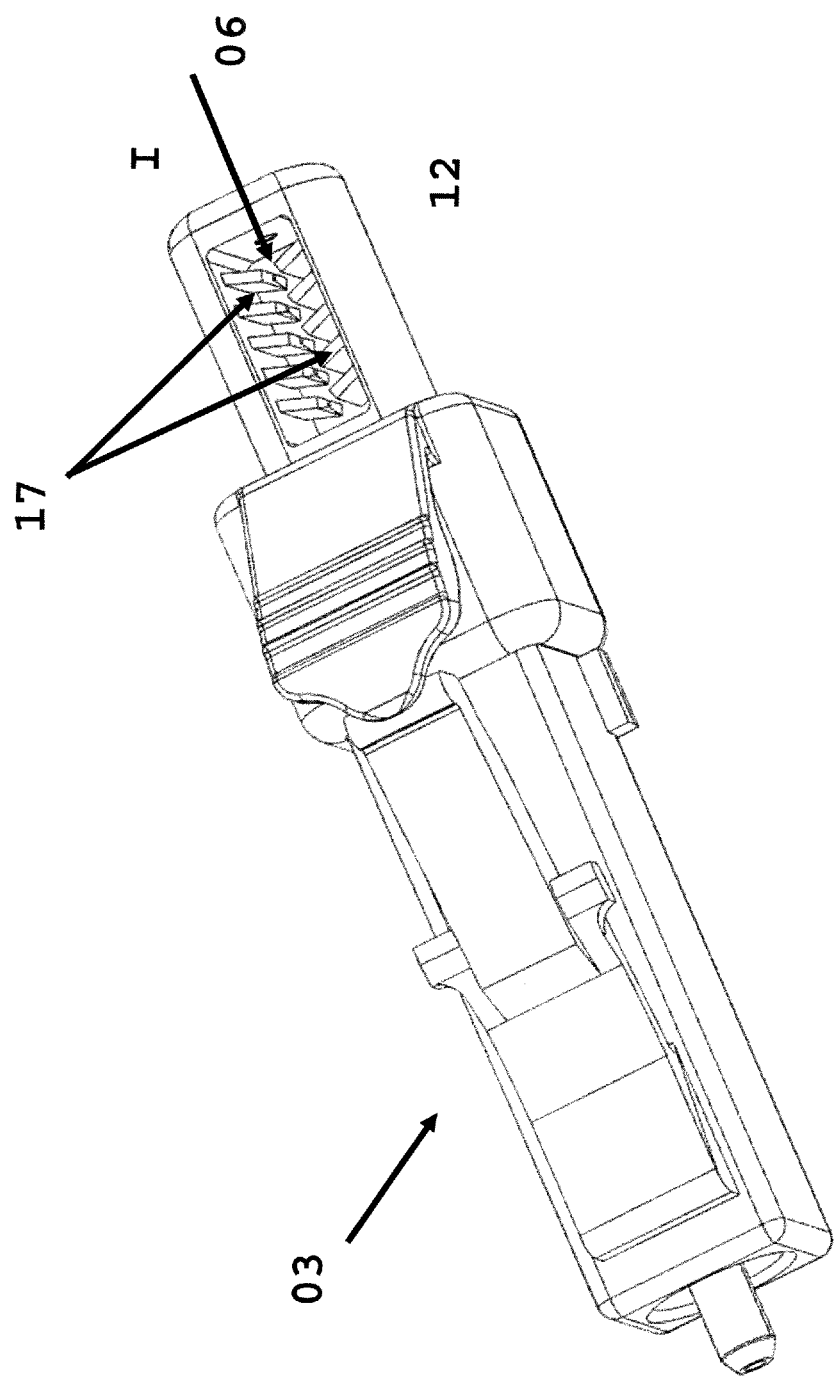
FIG. 13 is a top view of third embodiment of the retention assembly.
Figure 14:
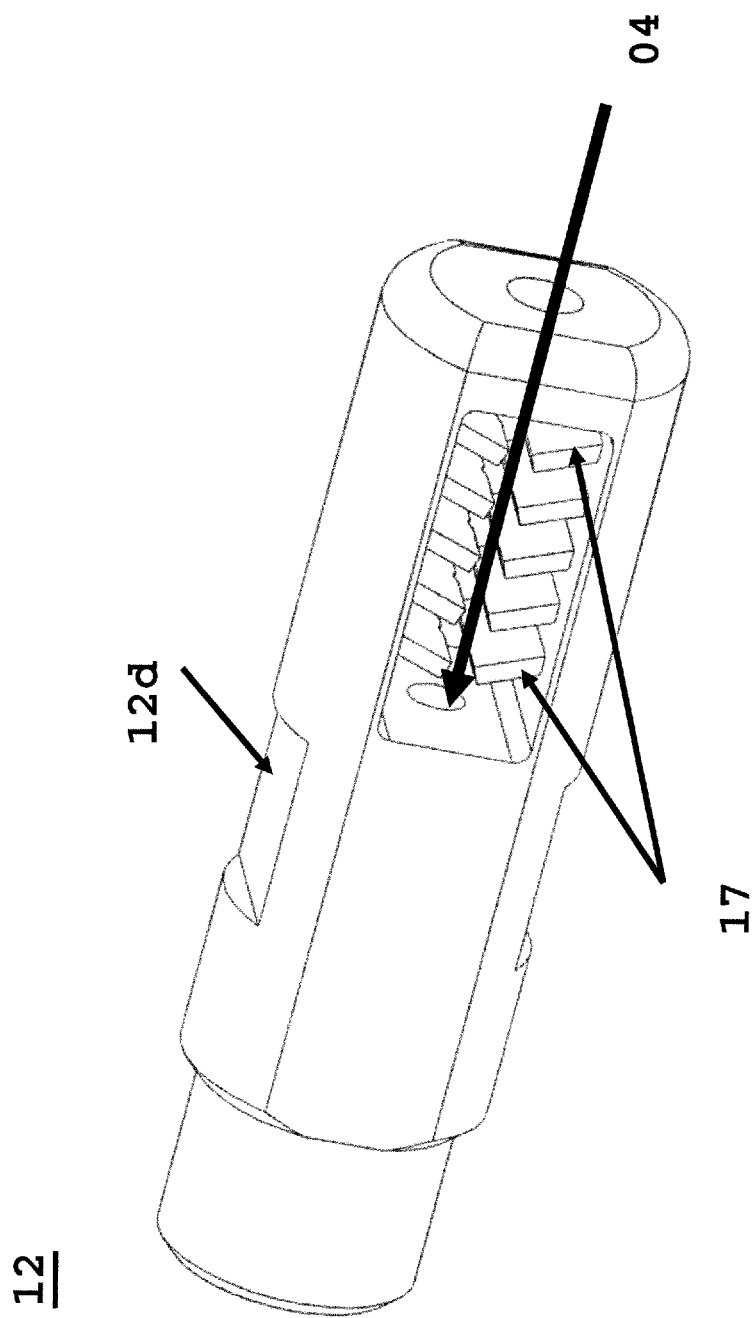
FIG. 14 is a side view of the retention body of FIG. 13.

Referring to FIG. 13, a third embodiment discloses inclined retention wings 17 that flex, either forward or backward, under the influence of POF cable 06 or optical fiber 06b. Upon insertion of POF into an opening, at distal end of retention body 12, wings 17 move or deflect toward proximal end of connector under insertion "I" force of POF fiber. The distance between inclined wings 17 and the distance across inclined wings determines insertion force need to deflect proximally facing inclined wings 17. A user may attempt to remove the connector using the POF fiber in distal direction. Inclined wings 17 will deflect distally, but with limited travel due to proximal facing incline. A proximal face of each retention wing will bind against POF cable or optical fiber preventing withdrawal of the POF cable from the connector assembly. The thickness and durometer or hardness of inclined wing 17 may allow a single wing pair to secure POF cable fiber within connector. FIG. 14 depicts a side view of inclined wings 17 within retention body 12. POF is inserted along into POF channel 04.

Figure 15:
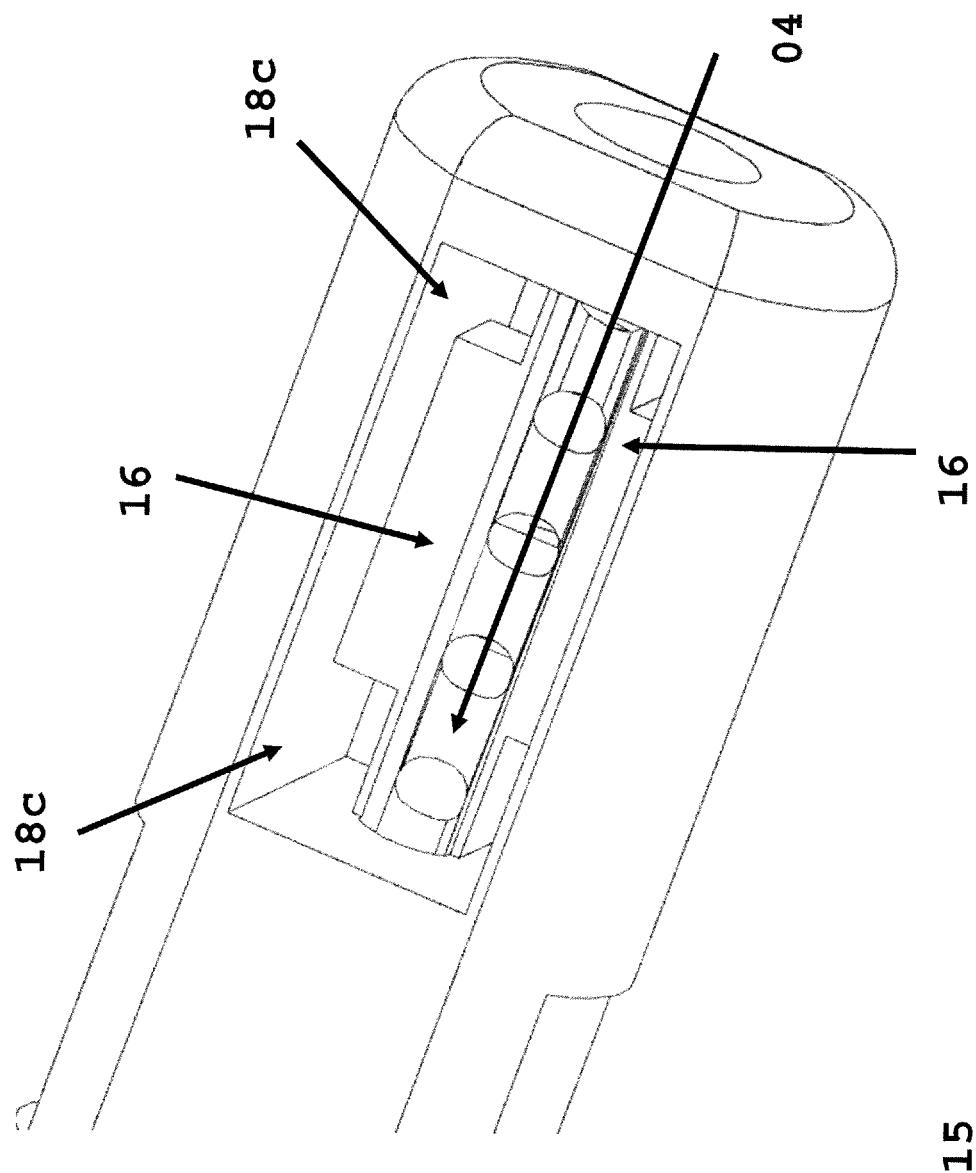
FIG. 15 is a top view of a fourth embodiment of the retention assembly.

FIG. 15 depicts a fourth embodiment of the retention assembly for securing a POF optical fiber to a fiber optic connector without the use of a crimp boot and ring. To secure POF fiber cable using a crimp boot and ring, the cable requires an outer jacket and inner strength fibers. This adds cost to the fiber cable itself, and substantially increases field install time as the user must (1) select a connector and determine the amount of outer coverings to strip off fiber, as opposed to inserted a fiber without outer coverings, (2) insert fiber into ferrule and ensure it is bottoms-out, otherwise remove and strip according to (1) again thereby adding more time, and (3) insert crimp ring, crimp about boot. By contrast once the POF Fiber is fully inserted and bottoms-out a retention cap is installed and secures fiber within connector.

Figure 16:
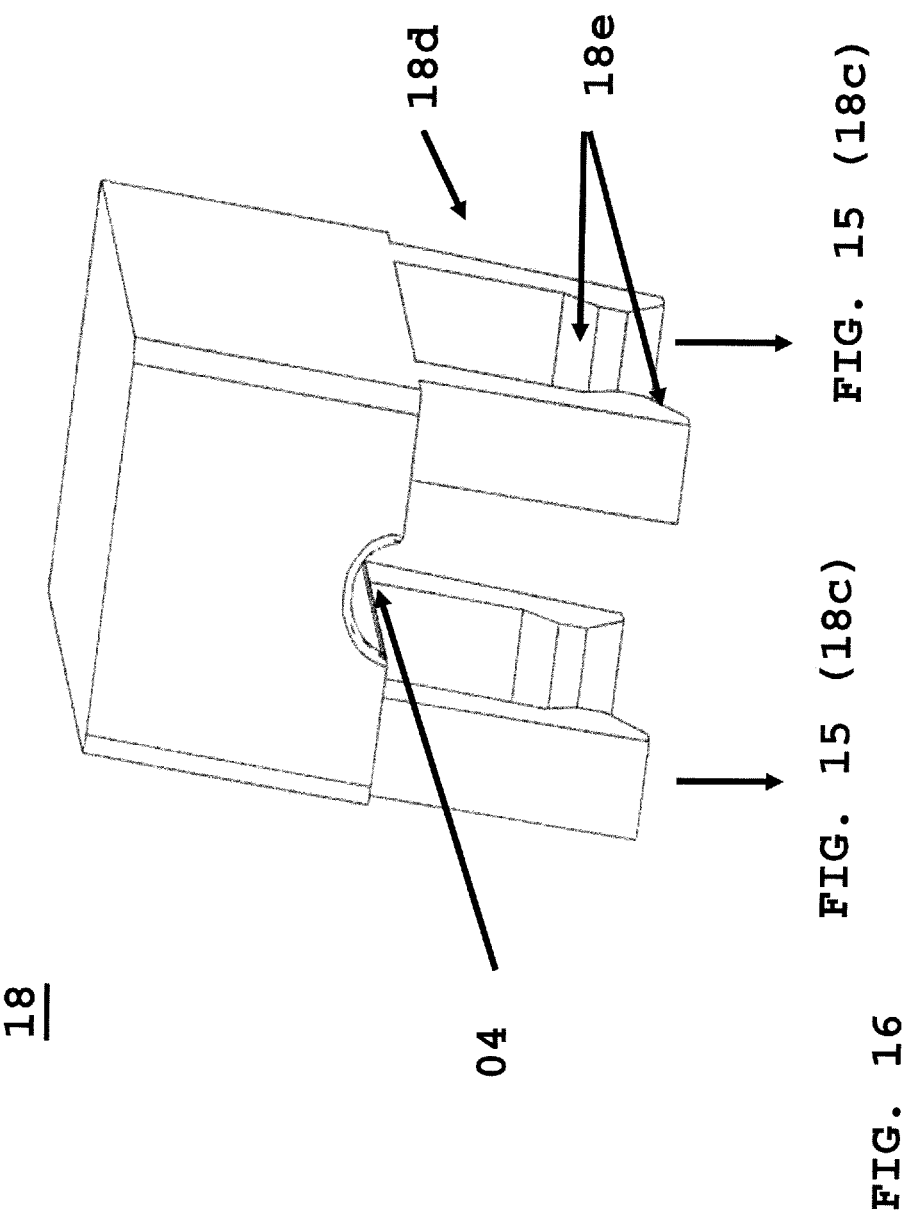
FIG. 16 is a perspective view of the retention cap used to secure the POF or polymer optical fiber in the connector of FIG. 15.

Referring to FIG. 15, POF Fiber channel 04 has opposing wings 16 as part of retention body at a distal end. Referring to FIG. 16, retention cap 18 has a plural of legs 18d with latch surface 18c that engage and secure to wings 16 via openings of 18c. The legs apply a compressive force that deflects wings 16 about POF fiber, which secures fiber within channel 04.

Figures 17, 18:
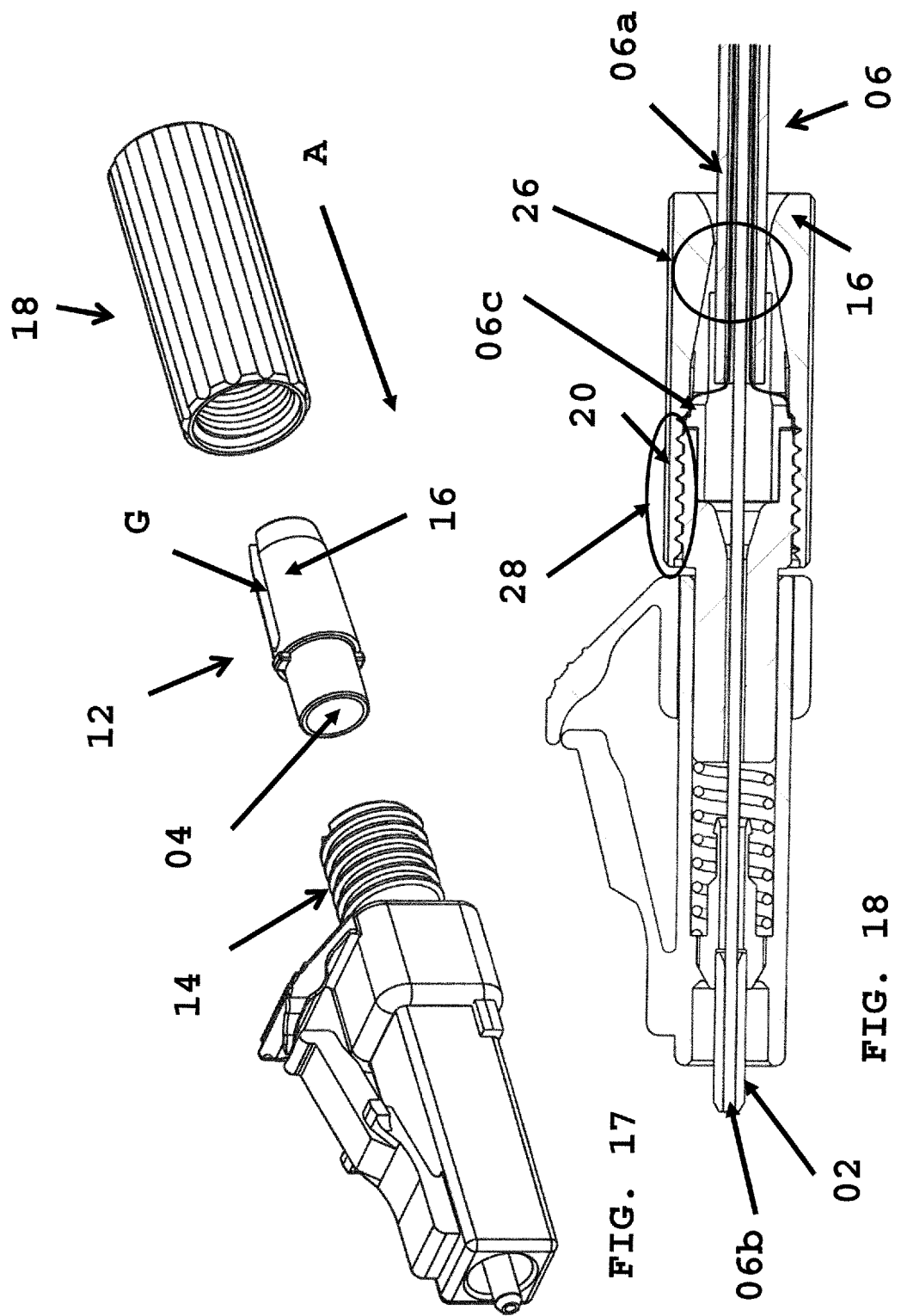
FIG. 17 is an exploded view of a fifth embodiment of the retention assembly.
FIG. 18 is a cross-section view of the connector of FIG. 17 assembled.

FIG. 17 depicts a fifth embodiment of retention body 12. Screw retention cap 18 accepts retention body 12 with pair of opposing wings 16 that forms a gap "G". Connector assembly 03 is assembled in direction of arrow "A". FIG. 18 depicts a cross-section of assembled connector in FIG. 17. Upon assembly, fiber jacket 06a is clamped or secured between retention wings 16 as shown in call out box 26. Strength members 06c are secured by among and between retention threads 20 by securing retention cap 18 on threads 20, as shown in call out box 28.

FIG. 19 and FIG. 20 depicts a sixth embodiment of retention body 12. POF fiber channel 04 is sized to accept just optical fiber 06b. Opposing wings 16 form a smaller gap "G" to accept optical fiber 06b, in FIG. 17. Backpost 14 is threaded, and has a pair of opposing cut-outs 14a that accept wedge shaped protrusion 12a. The mating of cut-outs 14a and protrusion 12a in direction of arrow "A" orients retention body 12, which prevents rotation of retention body so as not to stress optical fiber 06b when retention cap 18 is screwed onto backpost 14. Circumferential ribs 12d are formed about retention body 12. Ribs 12d become embedded in optical cable jacket 06a when retention cap 18 is screwed or slide onto the distal end of the retention body 12.

FIG. 20 depicts a sixth embodiment secures POF jacketed cable 06 at three points. Strength members 06c are secured between threaded backpost 14 and threaded retention cap 18, as shown in call out box 28. Optical fiber 06b is secured between wings 16, as shown in call out 26, when retention cap 18 compresses wings 16 as described in FIG. 5. Retention cap 18 has an inner tapered surface 18e that matches the outer tapered surface 16b of wings 16, and circumferentially about wings are spaced apart circumferential ribs 12d that become embedded in the cable jacket 06a when the retention cap 18 is threaded onto backpost 14. This helps prevent pulling the jacket out from a distal end of the connector.

Figure 21:
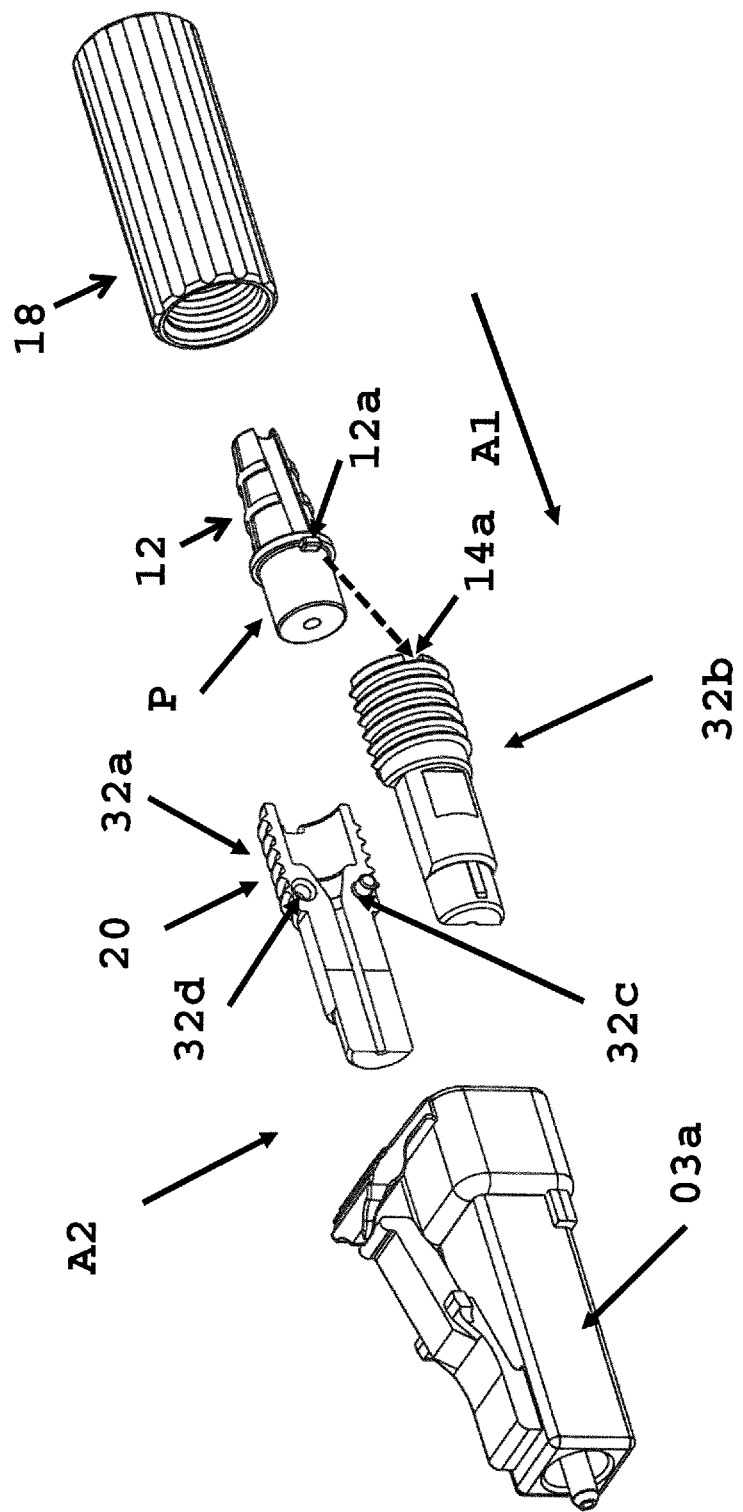
FIG. 21 is an exploded view of a seventh embodiment of the retention assembly.

FIG. 21 depicts an exploded view of a sixth embodiment of connector assembly 03 using retention body 12. Retention body 12 is secured between two half portions of split back post 32 that form backpost 14. Each half body portion further comprises a body portion (32a, 32b), threaded portion 20, pin 32c, pin recess 32d, and cut-out 14a, which accepts protrusion 12a. To assembly the two half portions, in Step A1 a proximal end "P" of retention body 12 is partially placed with a distal end of the half portions. Then the two half bodies are secured together in direction of A2, when pin 32c is accepted into a corresponding recess in the first half body portion 32b. Securing the two half portions together secures retention body 12 as part of backpost 14. Protrusion 12a is accepted in cut-out 14a, and this prevents rotation of retention body 12 during assembly, specifically when retention cap 18 is threaded onto retention threads 20 to secure POF cable 06 to connector assembly 03. The securing of POF cable 06 using retention body 12 is described in FIGS. 17 and 18. Two half body portions (32a, 32b) clamp or secure optical fiber 06b, as described in FIG. 22.

Figure 22:
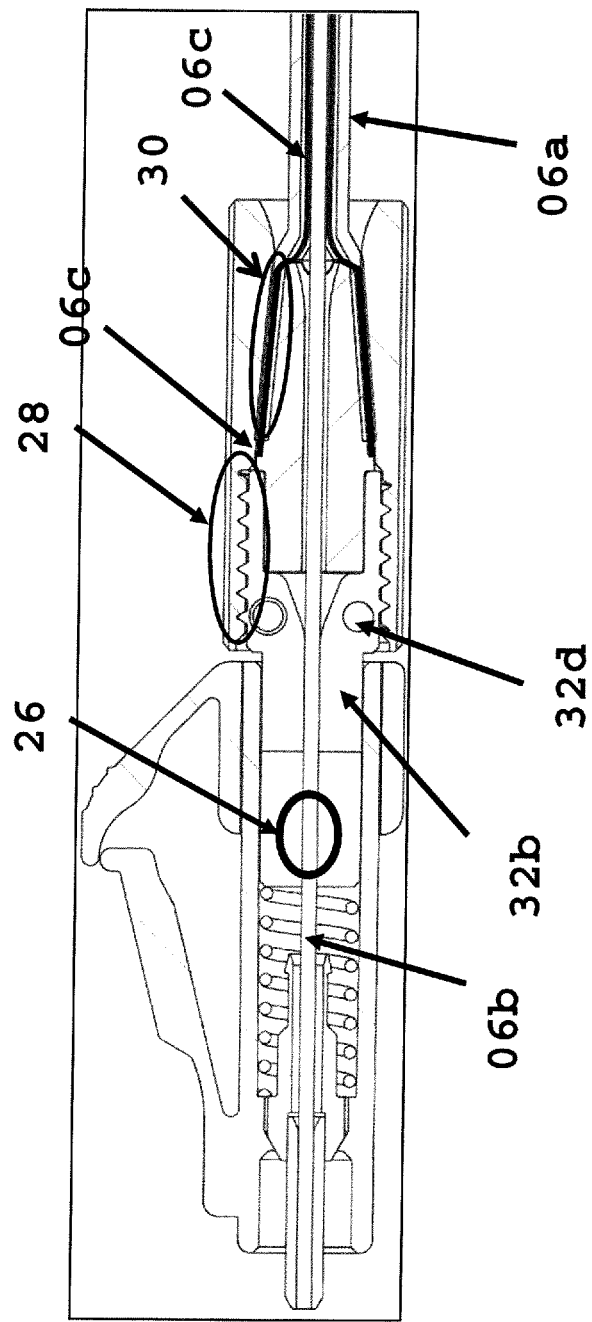
FIG. 22 is a cross-section of the connector of FIG. 21 assembled.

FIG. 22 depicts a cross-section of FIG. 21. Optical fiber 06b is clamped between two half body portions (32a, 32b) and is shown at call out 26. This directly secures POF optical fiber near ferrule 02 helping to reduce insertion loss due to movement of the optical fiber 06b within ferrule 02. A second clamp is applied to strength members 06c between the inner threads of retention cap 18 and retention threads 20 of retention body 12, as formed and described in FIG. 21. This second clamp is shown in call-out 28. Clamping strength members 06c by threaded portion of retention cap 18 and backpost 14 retention threads 20 helps provide maximum pull force rating for POF cable 06. The last clamp is depicted in call-out 30, were retention cap 18 clamps POF cable jacket 06a with wings 16, as described in FIG. 20.

Figure 23:
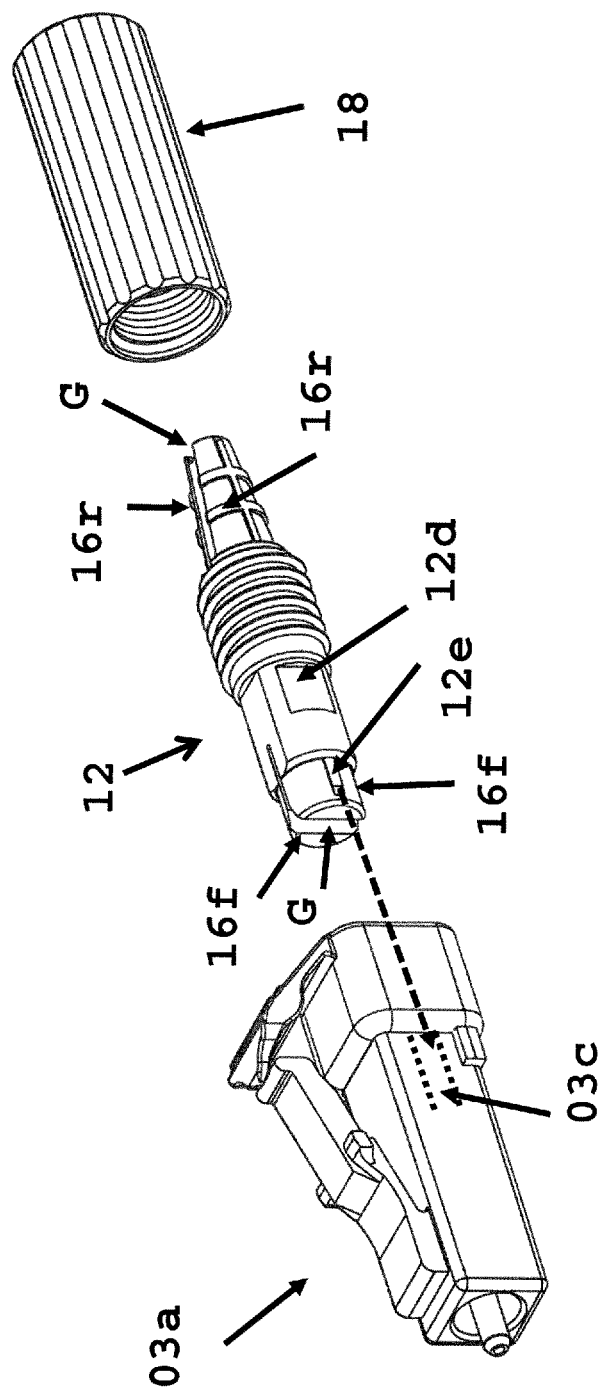
FIG. 23 is an exploded view of an eighth embodiment of the retention assembly.
Figure 24:
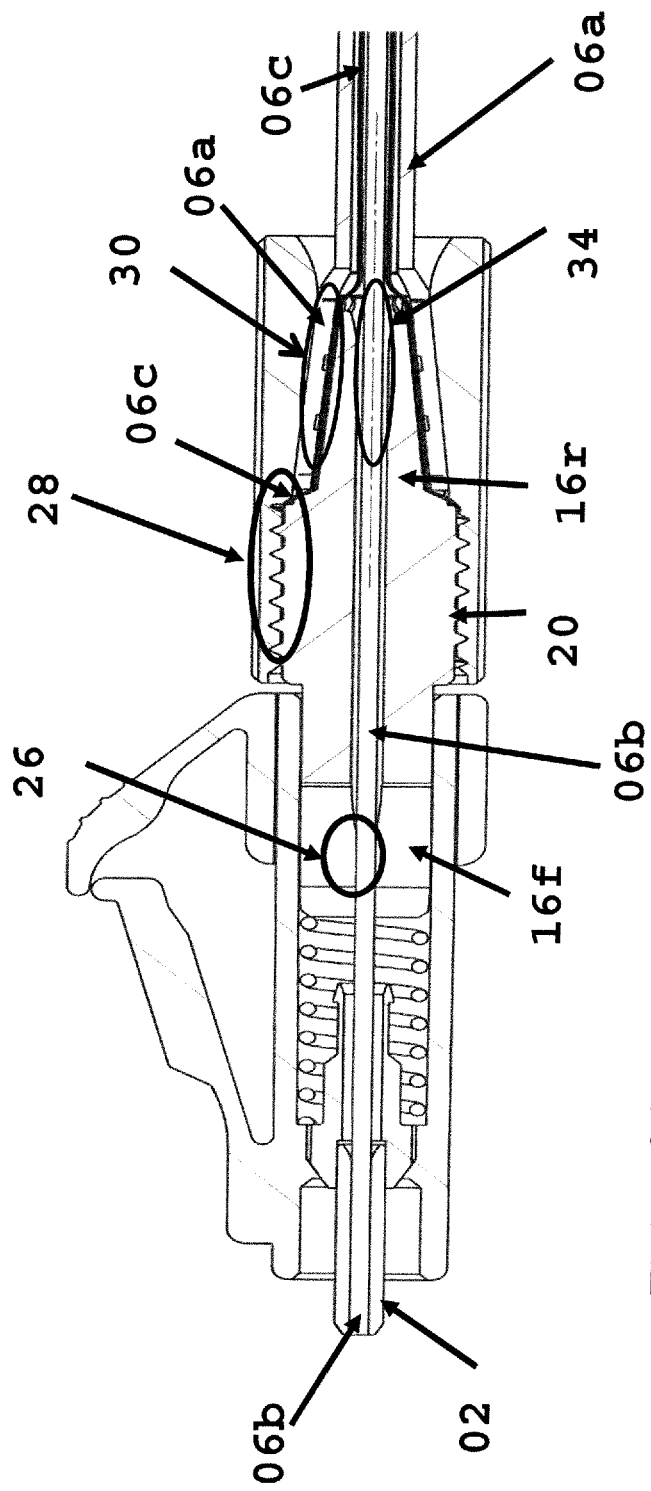
FIG. 24 is a cross-section of the connector of FIG. 23 assembled.

FIG. 23 depicts an exploded view of the last embodiment of retention body 12 with clamping or securing structure at a first end and a second end of retention body 12. This embodiment is similar described in FIG. 21 and FIG. 22 above, expect retention body 12 is a single, unitary body not formed of two separate body portions. A single body reduces assembly time, and improves connector assembly stability. Referring to FIG. 23, retention body 12 further comprises circumferential ribs 12d that is secured within a distal end of connector housing 03a by slot 03c. Circumferential ribs 12d and slot 03c secure retention body 12 within connector housing 03a. As well as ribs 12d accepting latch 3b. To prevent rotation of body 12 when securing with retention cap 18, as described above, protrusion 12e is fitted into internal slot 03c formed nearer the proximal end of inner housing of connector housing 03a. Once retention body 12 is secured within connector housing 03a, retention cap 18 is screwed onto backbody or backpost 14 retention threads 20 forming connector assembly as depicted in FIG. 24. Retention body 12 further comprises two securing or clamping sets of wings (16f, 16r). First set (16f) is at a proximal end of retention body. Second set (16r) is at a distal end of retention body.

FIG. 24 depicts the final assembly of connector assembly 03. Call-out 26 depicts forward (f) wings (16f) clamping POF optical fiber 06b. This is a direct clamp on the optical fiber without strength members 06c or outer jacket 06a. Call-out 30 depicts rear (r) wings (16r) clamping POF cable 06, with circumferential ribs 12d (as described in FIG. 20), become embedded in outer jacket 06a to help increase pull strength of the POF cable 06 thereby reducing connector assembly 03 failure due to the POF cable 06 being ripped out of connector. Call-out 34 depicts wings (16r) clamped about optical fiber 06b. Call-out 26 depicts forward wings (16f) clamping optical fiber 06b, to reduce insertion loss by helping to reduce optical fiber movement within ferrule 02, under cable stress during use. Call-out 28 depicts strength members 06c secured between inner threads of retention cap and outer threads 20 of retention body 12.

Figure 25:
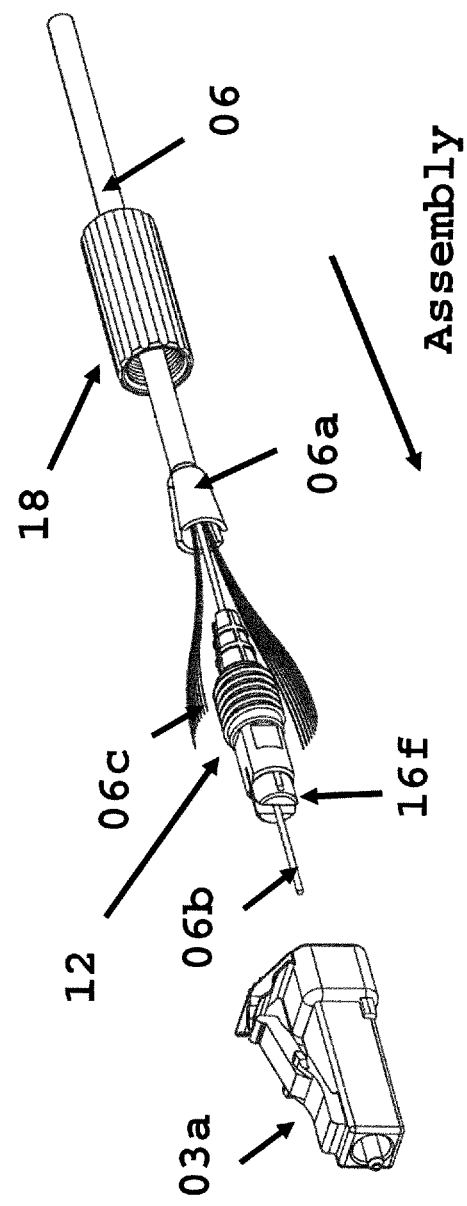
FIG. 25 is an exploded view of POF cable and connector assembly.

FIG. 25 depicts an exploded view of the connector assembly of FIG. 23 with strength members 06c and POF cable 06 cut open to fit over the distal end of retention body 12. To assemble, a user would slice outer cable jacket 06a, expose strength members 06c, and insert optical fiber 06b through retention body 12 beyond first or forward clamping wings 16f. A enough fiber 06b would be exposed to be inserted into ferrule 02 until it exists the ferrule, then the optical fiber 06b can be cut flush with tip in the field.

Figure 26:
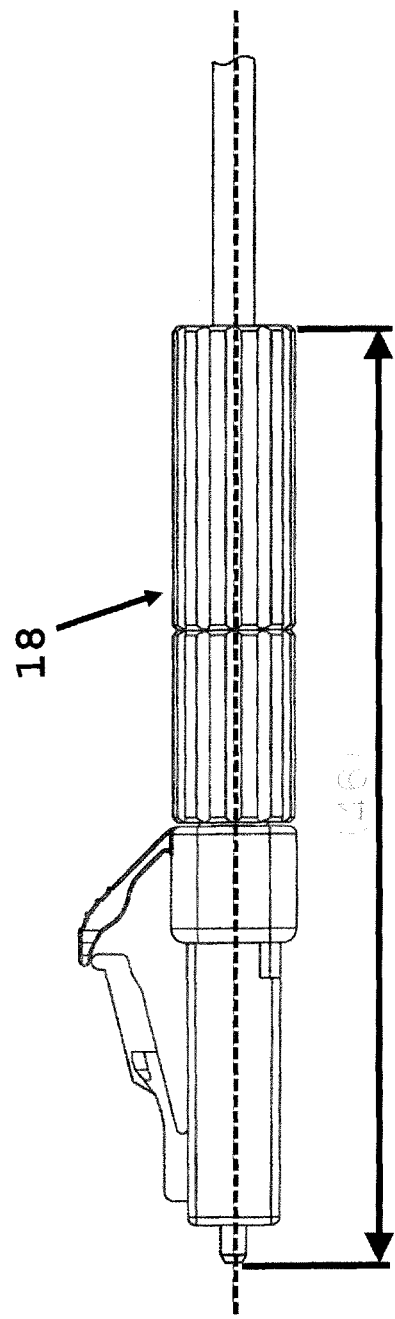
FIG. 26 is a prior art connector.
Figure 27:
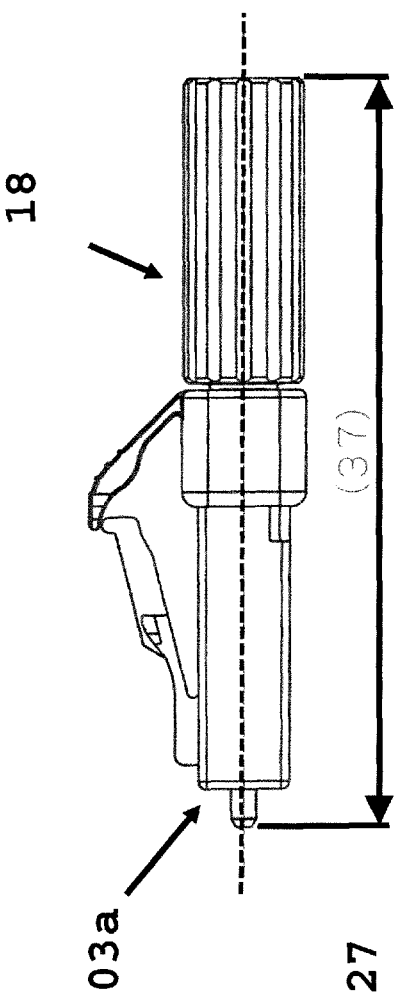
FIG. 27 is a perceptive view of the present invention.

FIG. 26 depicts a prior art connector assembly with an overall length of 46 units of length, with retention cap 18. FIG. 27 depicts reduced overall length to 37 units of length by deploying retention body 12 within connector housing 03a. Connector assembly 03 is assembled in direction of arrow.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera).

The invention claimed is:

1. A fiber optic connector comprising:
   a connector housing having a proximal end and a distal end;
   a backpost, the connector housing being configured to accept the backpost at the distal end; and
   a ferrule configured to accept an optical fiber, the ferrule is positioned at the proximal end of the connector housing;
   the backpost further comprising a pair of opposing wings at a proximal end,
   the pair the opposing wings are biased together upon assembly of the fiber optic connector;
   wherein the pair of biased opposing wings is configured to directly engage an unjacketed portion of the optical fiber to secure a fiber optic cable containing the optical fiber with the fiber optic connector; and
   wherein the pair of biased opposing wings is received in the connector housing proximal of the distal end of the connector housing.

2. The fiber optic connector according to claim 1, wherein the ferrule is single fiber ferrule configured to accept an optical fiber.

3. The fiber optic connector according to claim 1, further comprising a retention nut secured to the distal end of the connector housing and wherein the backpost further comprises another pair of opposing wings at a distal end portion of the connector body, the retention nut retaining and biasing the other pair of opposing wings about the optical fiber such that the back post directly engages a contiguous length of the optical fiber at first and second spaced apart locations.

4. The fiber optic connector according to claim 1, wherein the connector housing substantially biases the pair of opposing wings about the optical fiber.

5. The fiber optic connector according to claim 4, further comprising a retention nut configured to secure to the backpost a fiber optical cable jacket disposed about the optical fiber.

6. The fiber optic connector according to claim 1, in combination with the fiber optic cable, wherein fiber optical cable further comprises at least one strength member.

7. The fiber optic connector according to claim 6, wherein the at least one strength member is a synthetic fiber such as an aramid fiber.

8. The fiber optic connector according to claim 6, wherein the at least one strength member is a high-tensile strength material such as stranded steel.

9. The fiber optic connector according to claim 7, further comprising a retention nut, wherein the at least one strength member is secured between the retention nut and the distal end of the connector housing.

10. The fiber optic connector according to claim 6, wherein the at least one strength member is secured by at least one of the pair of biased opposing wings.

11. The fiber optic connector according to claim 9, wherein the fiber optical cable further comprises an outer jacket, and wherein the outer jacket is secured with the strength member by the pair of opposing wings.

12. The fiber optic connector according to claim 9, wherein the optical fiber is a polymer optical fiber secured between the pair opposing wings.

13. A backpost, comprising
   a body with a longitudinal bore,
   a proximal pair of opposing wings at a proximal end of the body and a distal pair of opposing wings at a distal end the body;
   the body being configured to secure with a connector housing; and
   wherein the proximal pair of opposing wings is configured to directly engage an unjacketed, contiguous portion of an optical fiber at a proximal location and the distal pair of opposing wings is configured to directly engaged the unjacketed, contiguous portion of the optical fiber at a distal location spaced apart from the proximal location to secure the optical fiber with the connector housing.

14. The backpost according to claim 13, in combination with a fiber optic cable, the fiber optic cable comprising the optical fiber and an outer jacket.

15. The backpost according to claim 14, wherein the fiber optic cable further comprises a strength member between the optical fiber and the outer jacket.

16. The backpost according to claim 13, wherein the body further comprises a threaded portion, and the threaded portion is configured to accept a retention nut for forming a fiber optic connector from the connector housing, backpost and a ferrule with at least one optical fiber therein.

17. The backpost according to claim 13, wherein the body further comprises a recess, the recess being configured to be secured with a corresponding portion of the connector housing configured to accept the recess and to secure the body to the connector housing for forming a fiber optic connector from the housing, backpost and a ferrule with at least one optical fiber therein.

18. The backpost according to claim 13, wherein the body further comprises a latch at a proximal end, the latch being configured to secure the backpost with a corresponding recess within the connector housing, and a threaded portion at a distal end of the body, the threaded portion being configured to accept a retention nut for forming a fiber optic connector from the housing, backpost and a ferrule with at least one optical fiber therein.

19. A fiber optic connector comprising:
   a connector housing having a proximal end and a distal end;
   a backpost, the connector housing being configured to accept the backpost at a distal end; and
   a ferrule with at least one optical fiber therein at a proximal end of the connector housing;
   the backpost further comprising a pair of opposing wings at one of at a proximal end and a distal end of the backpost; and
   the fiber optic connector further comprising a retention nut,
   wherein the pair of opposing wings comprises a proximal pair of opposing wings at the proximal end of the backpost and a distal pair of opposing wings at the distal end of the backpost,
   wherein the proximal pair of opposing wings is biased by the connector housing to directly engage a contiguous length of unjacketed optical fiber at a first location and the distal pair of opposing wings is biased by the retention nut to directly engage the contiguous length of unjacketed optical fiber at a second location spaced apart from the first location.

* * * * *